Jan. 27, 1931.  H. C. DILLIARD  1,790,409
CROSS MEMBER FOR ANTISKID DEVICE
Filed May 10, 1928
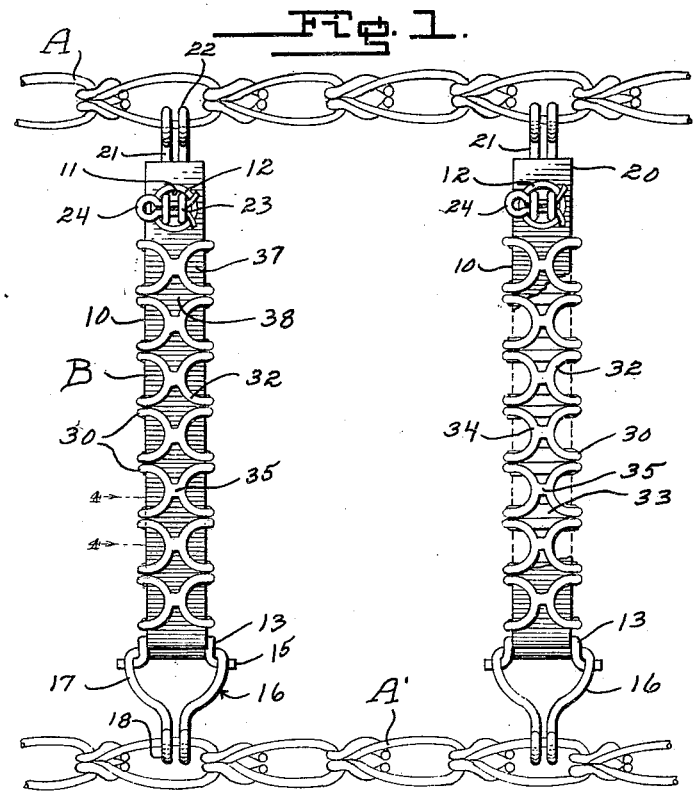
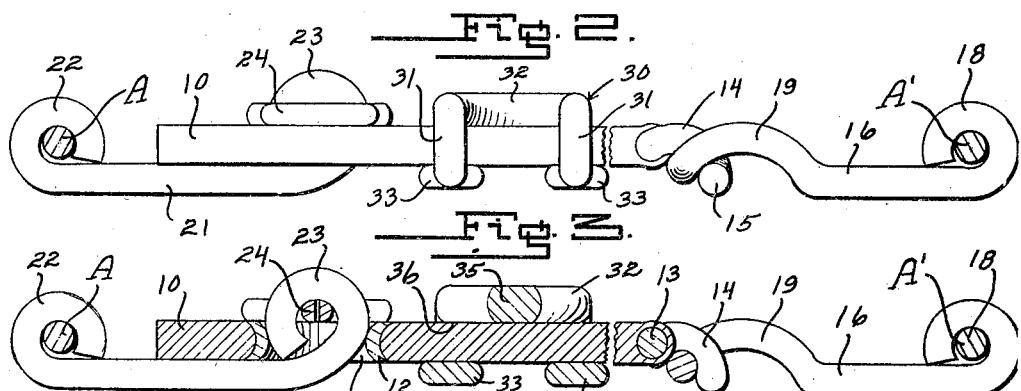
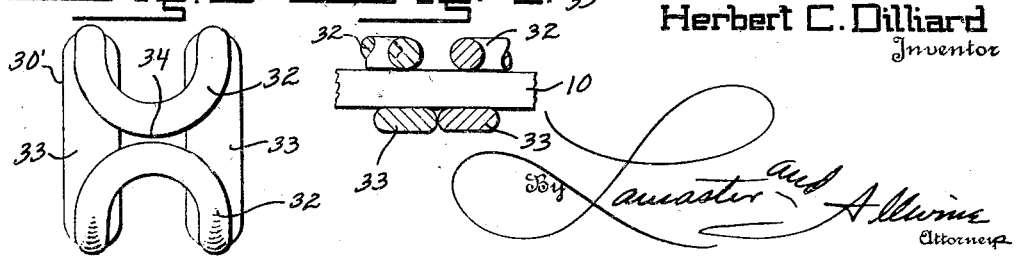
Herbert C. Dilliard
Inventor
By Lancaster and Allwine
Attorneys Patented Jan. 27, 1931

1,790,409

UNITED STATES PATENT OFFICE

HERBERT C. DILLIARD, OF EAST BANGOR, PENNSYLVANIA

CROSS MEMBER FOR ANTISKID DEVICES

Application filed May 10, 1928. Serial No. 276,759.

The present invention relates to improvements in anti-skid devices, and more specifically to cross or tread members for side chains.

The primary object of the invention is to provide a cross or tread member for side chains of anti-skid devices which will prevent loosening or slackening of the side chains thru a break occurring in the cross member.

A further object of the invention is to provide an improved type of cross or tread member of such construction that breaking or wearing out of one or more of the tread or gripping elements will not cause loosening of the side chains nor produce loose ends for causing injury to the vehicle fenders during rotation of the wheel to which the anti-skid device is applied.

A further object of the invention is to provide an improved cross or tread member for association with side chains embodying a construction wherein the tread or gripping elements are independent of one another and held in assembled relation in such manner that with a breaking of one of the elements the cross member will not be rendered ineffective as an anti-skid device.

A further object of the invention is to provide a cross member embodying a carrier strip for receiving a plurality of separable gripping elements, with means for detachably connecting the ends of the carrier strip to side chains in a manner whereby one end of the strip is readily detachable from one of the side chains for replacement of the gripping elements.

Other objects and advantages of the invention will be apparent during the course of the following detailed description, taken in connection with the accompanying drawing forming a part of this specification and in which drawing:

Figure 1 is a fragmentary plan view of an anti-skid device and showing the manner in which the cross members are applied to the side chains.

Figure 2 is an enlarged fragmentary edge view of the cross member and showing one of the tread or gripping elements in position on the flexible carrier strip.

Figure 3 is a central longitudinal section thru the cross member and showing the manner in which one end of the flexible strip is detachably coupled to one of the side chains.

Figure 4 is an enlarged fragmentary section taken on the line 4—4 of Figure 1.

Figure 5 is a plan view of a slightly modified form of tread member.

In the drawing, and wherein similar reference characters designate corresponding parts thruout the several views, the letters A and A' designate the side chains of the anti-skid device and B the improved cross members for connecting the side chains A and A' at spaced intervals along the chains.

The cross member B comprises a flexible strip 10 which may either be formed of rubber, fabric, or any other suitable material and is provided at one end with an aperture 11 which may be suitably reinforced by a metal eyelet 12. Secured in any preferred manner to the opposite end of the strip 10 is a yoke 13 having arcuate shaped arms 14 formed at each edge of the strip and terminating in oppositely projecting hinge portions 15 projecting laterally from each edge of the strip.

Adapted for connection at spaced intervals along the side chain A' are coupling loops 16 which may be formed from a suitable gauge of wire looped intermediate its ends to form a coupling head 17 and with the ends of the wire looped about the link of the chain A' as at 18. The side arms of the head 17 are arched upwardly as at 19, and these arched portions are intended to receive the laterally projecting hinge portions 15 of the yoke 13 in a manner whereby the yoke is detachably coupled to the coupling loop. It will readily be apparent the manner in which the strip 10 may be coupled to the loop 16 by leading one end of the strip thru the head 17.

Adapted for connection with the side chain A, for detachable connection with the apertured or free end 20 of the strip 10, are links or connectors 21 each of which is provided at one end with an eye 22 which is intended to be closed about a link of the chain A, and provided at the opposite end of the connectors is an eye 23 of a diameter to freely pass thru the aperture formed by the eyelet 12. As will be observed in Figures 2 and 3, the eyes or loops 22 and 23 are offset to a like side of the shank or main body of the connectors. The free or apertured end 20 of the strip 10 is intended to be detachably connected to the side chain A by passing the loops or eyes 23 thru the reinforced aperture 11 and then passing a suitable key or cotter pin as at 24 thru the eyes 23 at the outer side of the strip. If so desired the connectors 21 may be formed from a single piece of wire suitably bent to provide eyes at one end for attachment to the side chain and having an eye or eyes at its opposite end for positioning in the reinforced aperture 11. It is preferred that the eyes 23 be of a diameter to require that the eyes be sprung thru the eyelet 12, and that the eyes be offset to one side of the shank portion of the connectors as shown in Figure 3 so that the pull on the eyes will be against the free ends of the eyes and below the diametrical center of the eyes.

The flexible strip 10 is intended to slidably receive longitudinally therealong in abutting relation a plurality of substantially flat tread or gripping members 30, and which members may be formed from elongated straight metal links bent transversely adjacent each end into loops 31 with the arcuate or oval shaped ends 32 extending toward one another in spaced overlying relation to the parallel connecting arms 33. After transverse bending of the links for forming the tread members, the adjacent crown portions 34 of the arcuate ends 32 may be welded together as at 35 so that each tread member forms a substantially flat opening 36 of a dimension to slidably receive the flexible strip 10. The connected arcuate shaped ends 32 of the tread members are arranged at the outer face of the flexible strip, while the arms 33 extend transversely of the inner face of the strip and are preferably flat as clearly illustrated in Figures 3 and 4. This flattening of the arms 33 has been provided for preventing wear to the tire about which the cross members are connected, and further acts to retain the outer arcuate shaped portions 32 of adjacent tread members in slightly spaced apart relation as clearly shown in Figure 4. This spacing of the outer tread member portions 32 will permit of greater traction being formed by the tread members. By observing Figure 1 it will be seen that when a series of the tread members are positioned on the carrier strip 10 that a series of oppositely opening pockets 37 are formed along each edge of the strip with substantially closed pockets 38 formed along the center of the strip in staggered relation with the side opening pockets 37. This arrangement will afford a good gripping tread and also form a tread for preventing ready skidding.

It may here be well to state that the strip 10 is preferably of even cross sectional dimension thruout its length, and that it is preferred that the eyelet 12 be positioned in the strip so that its end edges do not project past the inner and outer faces of the strip as illustrated in Figure 3. By so having the ends of the eyelets 12 arranged flush with the faces of the strip such will permit of the tread members 30 being readily threaded on the strip from the end 20 without requiring that the height of the opening 36 thru the tread members be any greater than the thickness of the strip.

The tread members 30 need not necessarily be formed as previously set forth, but if so desired may be in the form of suitable castings and have modified forms of outer or tread surfaces other than the specific arrangement shown in Figure 1 formed by the arcuate shaped ends of the links. If so desired, the tread members may have the weld connection 35 omitted as shown in Figure 5, and wherein the same reference numerals have been applied to the tread member as used in Figures 1 to 4 inclusive. The tread member generally designated by the numeral 30' in Figure 5 will permit of economical manufacture of the tread members.

The flexible strip 10 may if so desired, be provided at each end with a reinforced aperture as shown at 11 for attachment at opposite ends of the strip to the side chains by means of the connectors 21. It is preferred however that one end of the strip be connected to one end of the side chains by the yoke and coupling loop 13 and 15 respectively since with such an arrangement it is merely necessary to remove a single cotter pin 24 when desiring to remove or renew the flexible strip 10. When desiring to renew or replace the tread members 30 it is merely necessary to remove the cotter pin 24 and withdraw the loops or eyes 23 from the aperture 11 and after which the tread members may be readily threaded on the flexible strip from the end 20. The strip 10 may also be easily removed by disconnecting the connectors 21 from the strip and then drawing the strip thru the open head 17 of the coupling loop 15.

The advantages to be gained thru a cross member constructed as shown are that the breaking or wearing out of one or more of the tread members 30 will not permit loosening of the side chains A and A' owing to the fact that the chains will be tied together by the flexible strip 10. It will also be apparent that should one or more of the tread members 30 become broken that no loose ends will be formed as occurs when a link breaks in the present type of link cross chains, and which breaking of the link cross chains permits loosening of the side chains.

From the foregoing description it will be apparent that a cross member of novel and improved construction has been provided embodying features of construction whereby the side chains will not become loosened thru breaking of any of the tread or gripping members. It will also be apparent that a novel arrangement has been provided whereby replacement may be easily and quickly made, and one wherein the gripping action of the cross member is provided by means of a series of independent tread members arranged in abutting relation upon a flexible carrier strip.

Changes in detail may be made to the forms of invention herein shown and described, without departing from the spirit of the invention or the scope of the following claims.

I claim:

1. In an anti-skid device the combination with a pair of parallel side chains, of a coupling loop for connection with one side chain and embodying an open head portion, a flexible carrier strip having a reinforced aperture at one end and insertable at said end thru the open head portion of said coupling loop, a yoke carried by the opposite end of the flexible strip and having lateral projections engageable with said head portion for limiting movement of the strip thru the head portion, connectors for connection with the companion side chain and including offset eye portions insertable outwardly thru the aperture in the strip, and a fastening element removably passing thru said eye portions at the outer side of the strip for securing the strip at one end to the connector.

2. A cross member for anti-skid devices, comprising a flexible strip having a reinforced aperture at one end and provided at its opposite end with a yoke including projections extending laterally of the side edges of the strip, and a series of substantially flat metallic tread members having rectangular shaped openings for threading of the tread members upon the strip from the apertured end of the strip, said tread members having gripping portions overlying the outer face of the strip.

3. A cross member for anti-skid devices, comprising a flexible strip, an attaching yoke carried by one end of the strip including laterally projecting arms, an eyelet secured in the opposite end of the strip with its ends flush with the side faces of the strip, and a series of tread members threaded on the strip from the eye carrying end thereof and each having a substantially flat opening of a dimension corresponding to the cross sectional dimensions of the flexible strip.

4. In a cross member of the class described the combination of a flexible strip, and open tread members threaded on the strip including spaced flattened arm portions traversing the inner face of the strip and arcuate gripping portions arranged over the outer face of the strip.

5. In a cross member for anti-skid devices the combination of a flexible strip, and metallic tread members threaded on the strip consisting of straight links looped transversely adjacent each end to provide oppositely arcuated gripping portions for extending over the outer face of the strip.

6. In a cross member for anti-skid devices, a flexible carrier strip having an enlargement at one end, and a plurality of tread members freely movable on the strip and removable from the opposite end of the strip only to permit of ready replacement of any or all of the tread members.

HERBERT C. DILLIARD.